United States Patent Office 2,844,336
Patented July 22, 1958

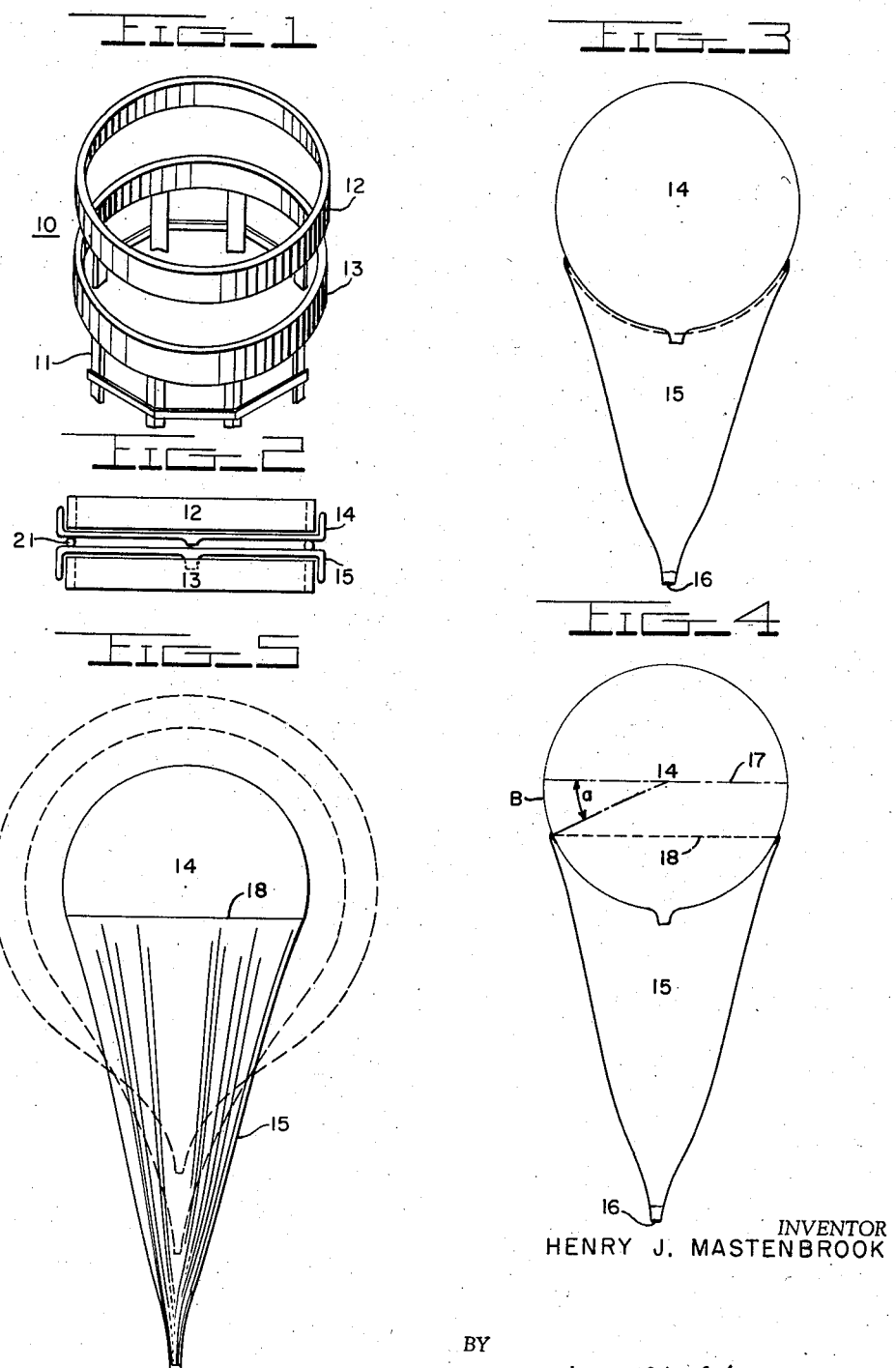

2,844,336

FAST RISING BALLOON

Henry J. Mastenbrook, Falls Church, Va., assignor to the United States of America as represented by the Secretary of the Navy Application August 15, 1955, Serial No. 528,565

1 Claim. (Cl. 244—31)

(Granted under Title 35, U. S. Code (1952), sec. 266)

The invention described herein may be manufactured and used by or for the Government of the United States of America for governmental purposes without the payment of any royalties thereon or therefor.

This invention relates to fast rising balloons, and more particularly to a method of making fast rising high altitude balloons of extensible materials, such as rubber or neoprene.

In balloon constructions of the prior art it has been customary to provide a gas proof bag of rubberized material to retain lifting gases and to provide a load net superimposed over the bag. Other balloons have been constructed of rubberized material with a semispherical top and cone bottom, but fins are required on the bottom to guide the balloon upward. Still other balloons have been made of vertical sections of plastic material with reinforced seams.

The present invention involves a jig which is used in connection with a deflated spherical ballon material whereby a skirt is secured to the spherical section by using the jig and any suitable adhesive between the two sections. The use of the jig of this invention for securing a skirt to a spherical balloon enables one to make a fast rising high altitude balloon in very little time.

It is an object of the present invention to provide a device for making fast rising high altitude balloons.

A further object of the present invention is to employ a new method for producing fast rising high altitude balloons from extensible materials.

A still further object of this invention is to make a fast rising high altitude balloon by employing a jig for securing two separate sections to each other.

Other and more specific objects of this invention will become apparent upon a careful consideration of the following detailed description when taken together with the accompanying drawings, in which;

Fig. 1 is a side elevational view of the production jig of this invention,

Fig. 2 is a sectional view illustrating the jig with balloon sections stretched over the annular rings of the jig and positioned to be joined, Fig. 3 illustrates a section through a balloon in its unfinished but assembled position, Fig. 4 illustrates a section through a finished balloon and the arrangement of the balloon sections, and Fig. 5 illustrates the relationship of the balloon structure as it rises into the air.

Now referring to the drawings, Fig. 1 illustrates a jig 10 formed by a lower section 11 and an adjacent top ring section 12. The lower section 11 is made with a second ring section 13 secured to a supporting structure. The ring sections 12 and 13 have the same dimension in diameter and width for the adjacent faces so that they coincide when they are brought together.

In using the jig to assemble a fast rising high altitude balloon, two balloon sections 14 and 15 made of extensible material are stretched over respective ring sections. Adhesive 21 is applied to adjacent surfaces of each balloon section along the surface of the balloons which is directly over adjacent faces of the ring sections in such a manner that the two ring sections will come together one above the other. After the adhesive is applied to the surface of the balloons, the ring sections are pressed together and pressure is applied in any well known manner until the adhesive is set.

When the adhesive has set, the joined balloons are removed from the jig and the lower balloon 15 is cut to form a skirt for the upper balloon. The lower balloon has an opening 16 in the bottom to permit entrance into the inside and the portion of the bottom balloon that lies within the boundaries of the junction of said balloons (shown in dotted line in Fig. 3) is cut away to form the skirt. The skirt allows the upper balloon 14 to expand more rapidly in this region. The skirt can be filled with air or left open to atmospheric pressure.

The opening 16 in the skirt section also allows access to the valve of the upper balloon. The valve for the upper balloon could be positioned on top rather than on the bottom within the skirt but is preferred to be within the skirt section. The opening 16 also provides a surface to attach a load before allowing the balloon to rise.

The diameter of the ring sections of jig 10 is made according to the size of the balloon. The diameter must be of such size that the skirt will be secured circularly to the lower half or lower semispherical surface of the upper balloon at an angle $\alpha$ between 30 and 60 degrees, the angle being measured from the center with a plane through the diameter 17 parallel to the secured position 18 as one side. Stated in other terms, the angle is the acute angle included by a diameter which is parallel to the line of attachment of the skirt to the spherical balloon, which line of attachment is a minor circle, and a radius to the aforesaid line of attachment. Fig. 4 graphically describes this angle which can also be defined in terms of the arc B which subtends it, the angle $\alpha$ being 30 to 60°. The secured position 18 of the skirt can be varied for different balloons according to the altitude desired for the balloon to reach. The greater the angle for the secured position of the skirt the higher the elevation for which the assembly achieves a minimum drag coefficient.

A fast rising high altitude balloon made with this method has attained velocities of 4000 ft./min. Other advantages are the balloons can be smaller in ground size compared to non-extensible balloons now used as rapid rising balloons. It is more stable than known balloons and it does not require a fin structure for stability. The high center of lift together with the drag force located at the base of the skirt provides a stabilizing couple which maintains stability during ascent. This is not possible in other balloon designs where the lifting gas is not confined to the upper portion of the balloon. As the balloon rises the balloon expands, expanding into the skirt portion and at the same time expanding the skirt wherein the lower end of the skirt is brought closer to the spherical balloon in accordance with the expansion as shown by dotted line in Fig. 5.

A typical balloon used is 10 ft. in diameter (gas filled at ground level) and the skirt is secured circularly to the lower half of the upper balloon at an angle of 45° originating at the center with a plane through the diameter as one side. In order to secure the skirt portion to the upper balloon, a jig with ring sections of 4 ft. in diameter and having a face width of ½ inch is used. This jig enables one to make a fast rising high altitude balloon economically and with very little time involved.

Obviously many modifications and variations of the present invention are possible in the light of the above teaching. It is therefore to be understood, that within the scope of the appended claim, the invention may be practiced otherwise than as specifically described.

What is claimed is:

A fast rising high altitude balloon comprising a gas-tight spherical balloon made of extensible material, an inverted conical skirt of extensible material circumferentially attached to said spherical balloon along a minor circle located a distance from a parallel major circle of said spherical balloon which corresponds to a length of arc between said circles required to subtend an angle of from about 30 to 60 degrees, said angle of attachment providing a stabilizing couple which maintains stability during ascent, and said spherical balloon and said conical skirt being unrestrained in their natural ability to extend during ascent.

References Cited in the file of this patent

UNITED STATES PATENTS

| | | |
|---|---|---|
| 673,776 | Kavanagh | May 7, 1901 |
| 2,707,603 | Moore | May 3, 1955 |

FOREIGN PATENTS

| | | |
|---|---|---|
| 25,825 | Great Britain | 1911 |